US006781796B2

United States Patent
Macpherson et al.

(10) Patent No.: US 6,781,796 B2
(45) Date of Patent: Aug. 24, 2004

(54) COUNTERBALANCE FASTENER FOR A DISC DRIVE STACKED ACTUATOR

(75) Inventors: Aaron S. Macpherson, Fort Collins, CO (US); Joe A. Wood, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 64 days.

(21) Appl. No.: 10/112,269

(22) Filed: Mar. 27, 2002

(65) Prior Publication Data

US 2003/0076633 A1 Apr. 24, 2003

Related U.S. Application Data

(60) Provisional application No. 60/366,694, filed on Oct. 18, 2001.

(51) Int. Cl.[7] .............................................. G11B 21/08
(52) U.S. Cl. ................................................... 360/265.7
(58) Field of Search .......................... 360/265.7, 265.9, 360/265.6, 264.2–264.4, 244.5–244.7, 9.71–97.2

(56) References Cited

U.S. PATENT DOCUMENTS

| | | | |
|---|---|---|---|
| 5,260,847 A | 11/1993 | Basehore et al. | |
| 5,491,598 A | * 2/1996 | Stricklin et al. | 360/98.07 |
| 5,768,063 A | 6/1998 | Suwa et al. | |
| 5,854,721 A | 12/1998 | Lim | |
| 5,867,348 A | 2/1999 | Suwa | |
| 6,021,025 A | 2/2000 | Komura et al. | |
| 6,084,744 A | * 7/2000 | Genheimer et al. | 360/97.02 |
| 6,185,075 B1 | * 2/2001 | Tsujino et al. | 360/265.7 |
| 6,226,157 B1 | 5/2001 | Kim | |
| 6,288,867 B1 | 9/2001 | Jierapipatanakul et al. | |
| 6,487,053 B1 | * 11/2002 | Matsumura et al. | 360/265.7 |

* cited by examiner

*Primary Examiner*—Allen Cao
(74) *Attorney, Agent, or Firm*—Fellers, Snider, et al.

(57) ABSTRACT

A stacked actuator for controllably positioning a data transducing head adjacent a data recording surface in a disc drive, and a method for fabricating the stacked actuator. The stacked actuator is formed from a plurality of stackable members arranged into a component stack. A counterbalance fastener is installed on a first side of the component stack to secure the stackable members together. A flex circuit assembly is subsequently affixed to a second side of the component stack opposite the first side. The mass and location of the counterbalance fastener are selected to counterbalance the mass of the flex circuit assembly so that the completed actuator is nominally balanced about an actuator rotational axis.

19 Claims, 5 Drawing Sheets

COUNTERBALANCE FASTENER FOR A DISC DRIVE STACKED ACTUATOR

RELATED APPLICATIONS

This application claims priority to U.S. Provisional Application No. 60/366,694 entitled DISC DRIVE STACKED ACTUATOR CLAMP SCREW filed Oct. 18, 2001.

FIELD OF THE INVENTION

The claimed invention relates generally to the field of disc drive data storage devices and more particularly, but not by way of limitation, to a disc drive stacked actuator having a counterbalance fastener which secures stacked components in the actuator together and which acts as a counterbalance to a flex circuit assembly mounted to the actuator.

BACKGROUND

Data storage devices of the type known as Winchester disc drives are well known in the art. Such disc drives magnetically record digital data on one or more rigid recording discs that are rotated at a constant, high speed. An array of data transducing heads access data tracks defined on the various disc surfaces to write data to and read data from the discs.

An actuator is used to controllably position the heads adjacent the discs. A typical rotary actuator is rotated about an actuator rotational axis by way of a cartridge bearing assembly affixed within a central body portion of the actuator. Rigid actuator arms project from the central body portion in a direction generally toward the discs, and flexible suspension assemblies (flexures) are affixed to the ends of the rigid actuator arms. Each flexure supports a head adjacent a corresponding data recording surface. The heads are provided with aerodynamic features that allow the heads to be supported upon a thin layer of air currents established by rotation of the discs.

A typical rotary actuator further comprises a flat actuator coil which projects from the central body portion opposite the rigid actuator arms. The coil is immersed in a magnetic field established by one or more permanent magnets and magnetically permeable pole pieces of a voice coil motor (VCM). Application of current to the coil establishes electromagnetic fields which interact with the magnetic field of the VCM to cause the actuator body to rotate about the actuator axis. As the actuator body rotates, the heads are swept across the corresponding disc surfaces to bring a selected head into alignment with a selected data track.

A flex circuit assembly is typically provided to facilitate electrical communication between the heads and coil and disc drive control circuitry. A typical flex circuit assembly comprises an array of flexible, laminated ribbons with embedded parallel signal traces that transmit coil driver current to the coil and write and read signals to and from the heads. It is common to incorporate preamplifier driver (preamp) circuitry onto the flex circuit assembly, and to mount the preamp to a side of the actuator body. The preamp generates write signals for the writing of data and preamplification and other signal processing during the reading of data.

Some disc drives of the current generation employ what is referred to as a stacked actuator configuration. A stacked actuator is formed by stacking a number of substantially planar components together to provide the final desired actuator configuration. A through-fastener can advantageously be used to clamp the various components together during the assembly process prior to insertion of the cartridge bearing assembly into the central actuator body portion.

It is generally desirable to provide a nominally balanced actuator to achieve optimal data transfer performance and external shock and vibration resistance. Disc drive designers typically attempt to align the actuator center of mass with the actuator rotational axis. Attempts are also typically made to achieve nominally symmetrical mass balancing along a centerline that passes along a length of the actuator from the coil, through the actuator rotational axis and out to the heads.

Actuator balancing is adversely affected to some degree by the attachment of the flex circuit assembly (including the preamp and associated bracketing) to one side of the actuator. Compensating for this imbalance that arises from the flex circuit assembly can be made in a number of ways. One way generally involves adding additional mass to the other side of the actuator body portion opposite the preamp to cancel the mass added by the flex circuit assembly. Another way is to cant the coil slightly about the actuator axis away from the flex circuit assembly so that a small amount of skew is provided between the actuator arm centerline and the coil centerline.

While operative to reduce actuator imbalance, these and other approaches have been found undesirable for a variety of manufacturing and performance reasons. Designers are motivated to reduce mass of the actuator to achieve faster seek times and improved control, so adding additional mass to the actuator to cancel imbalance runs counter to this goal. Canting the actuator coil so that the coil and arms are no longer in a straight line through the axis of rotation can tend to introduce vibration modes that can affect head positioning during operation, and can also increase manufacturing costs.

Accordingly, there is a continued need for improvements in the art to promote the design and manufacture of actuators which are nominally balanced, have relatively low mass and support manufacturing in an automated assembly environment.

SUMMARY OF THE INVENTION

A stacked actuator for use in a disc drive and a method of fabricating the same are disclosed. In accordance with preferred embodiments, a disc drive includes a number of discs rotatable about a disc rotation axis.

A stacked actuator comprises a plurality of stackable members including at least one substantially planar arm member which supports a data transducing head and at least one substantially planar spacer which establishes an elevational location of the arm member. The stackable members form a component stack configured for rotation about an actuator rotational axis. An external component such as a flex circuit assembly providing an electrical communication path for the head, is affixed to the component stack.

A counterbalance fastener engages the component stack to secure the stackable members together and to remove imbalance about the actuator rotational axis induced by the flex circuit assembly. The fastener preferably comprises a through-hole threaded bolt which extends through a respective fastener aperture formed in each of the stackable members to secure the stackable members together.

Preferably, the stacked actuator further comprises a cartridge bearing assembly disposed within the component stack to facilitate rotation of the actuator about the actuator rotational axis, wherein the cartridge bearing assembly is disposed between the fastener and the flex circuit assembly. The flex circuit assembly preferably comprises a preamplifier driver circuit affixed to the component stack, wherein the fastener operates to remove imbalance induced by a mass of the preamplifier driver circuit.

The method preferably comprises steps including providing a plurality of stackable members comprising at least one substantially planar arm member configured to support a data transducing head and at least one substantially planar spacer configured to establish an axial location of the at least one arm member along an actuator rotational axis; arranging the stackable members into a component stack; installing a counterbalance fastener at a fastener location proximate a first side of the component stack to secure the stackable members together; and attaching a flex circuit assembly proximate a second side of the component stack opposite the first side to provide an electrical communication path for the actuator, wherein the fastener location is selected such that a mass of the fastener operates to counterbalance a mass of the flex circuit assembly to nominally balance the actuator about the actuator rotational axis.

The method further preferably comprises installing a cartridge bearing assembly into a central bore of the component stack, the cartridge bearing assembly facilitating rotation of the actuator about the actuator rotational axis. The cartridge bearing assembly is preferably installed by providing the cartridge bearing assembly with a cylindrical outer bushing having a proximal end and a distal end, wherein a head flange radially extends about the proximal end and threads are provided on the distal end.

The cartridge bearing assembly is inserted through the central bore of the component stack so that the head flange comes into abutting alignment with the component stack, after which a carriage nut is installed onto the threads on the distal end of the outer bushing so that the carriage nut and the head flange cooperate to provide a clamping force upon the component stack. Preferably, the stackable members are arranged into the component stack such that a center of mass of an actuator coil is aligned along a centerline defined along a largest length of the at least one arm member.

By using the fastener to fasten the stack during manufacturing and thereafter as a counterbalance for the flex circuit assembly (including the preamplifier driver circuit), the fastener promotes a lower mass actuator design since additional mass need not be added to the actuator to offset the mass of the flex circuit assembly. Placing the fastener opposite the flex circuit assembly also allows use of symmetric actuator arms, which improves resonance and tilt drop performance.

These and various other features and advantages which characterize the claimed invention will become apparent upon reading the following detailed description and upon reviewing the associated drawings.

BRIEF DESCRIPTION OF THE DRAWINGS

FIG. 6 provides an elevational, cross-sectional view of a number of components which compose the stacked actuator of FIGS. 1–5 to illustrate preferred use of an assembly fixture during installation of a counterbalance fastener.

DETAILED DESCRIPTION

Figure 1:
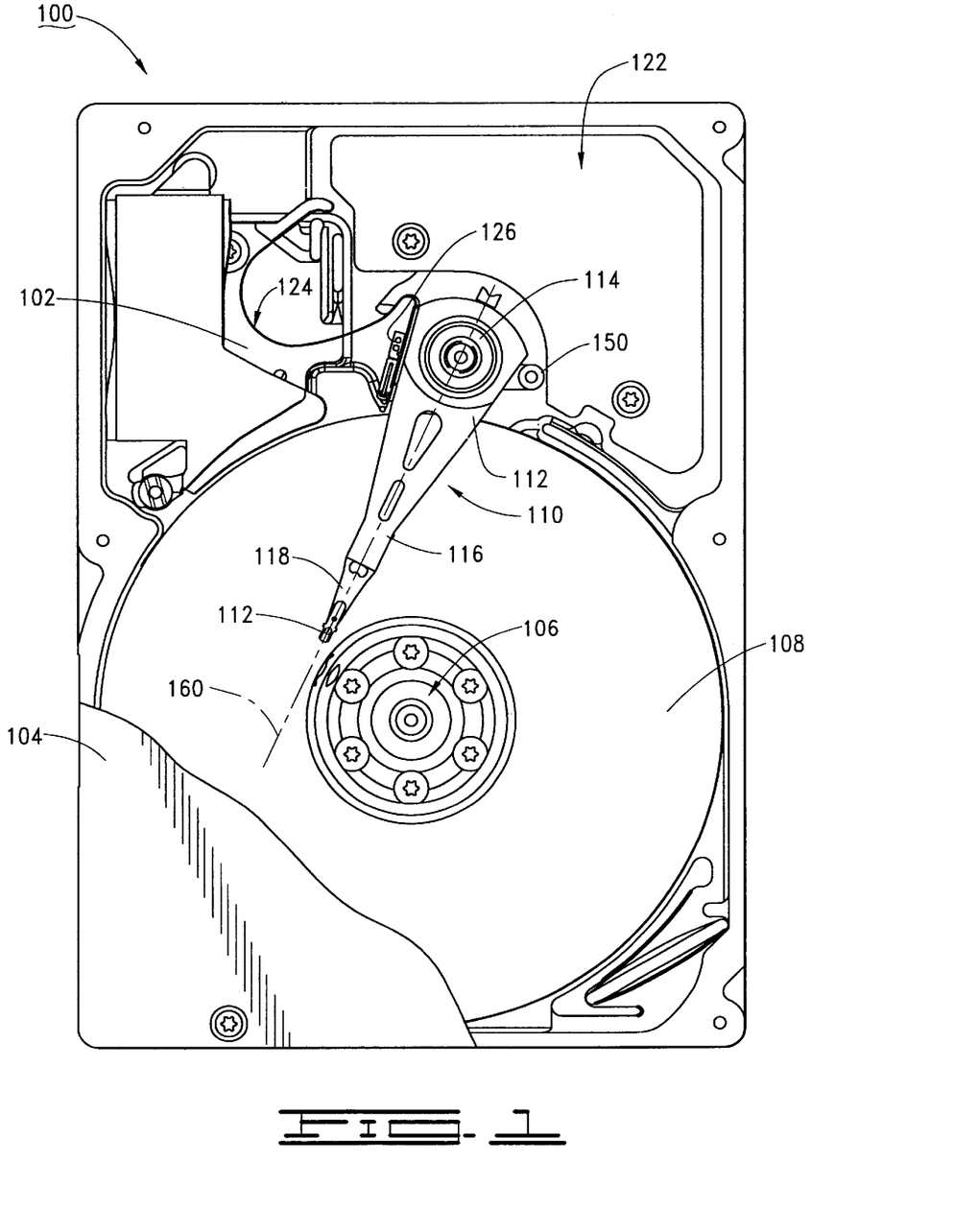
FIG. 1 is a plan view of a disc drive having a stacked actuator constructed in accordance with preferred embodiments of the present invention, the stacked actuator used to support an array of data transducing heads adjacent recording surfaces of a number of data recording discs.

FIG. 1 provides a top plan view of a disc drive 100 constructed in accordance with preferred embodiments of the present invention. A base deck 102 and a top cover 104 (shown in partial cutaway) cooperate to form a sealed housing for the disc drive 100. A spindle motor 106 rotates a number of magnetic recording discs 108 at a constant, high speed.

An actuator 110 includes a central body portion 112 which rotates about an actuator axis through the operation of a cartridge bearing assembly 114. The cartridge bearing assembly 114 includes one or more ball bearing assemblies and sleeves which facilitate the rotation of the central body portion 112 about a stationary shaft supported by the housing. A number of individual rigid actuator arms 116 extend from the central body portion in a direction toward the disc surfaces.

Flexible suspension assemblies 118 (flexures) extend from the arms 112 to support an array of read/write data transducing heads 120, with each respective head 120 adjacent a different disc recording surface. The disc drive 100 of FIG. 1 is contemplated as having two discs 108, three interleaved actuator arms 116 and four heads 120, although other respective numbers of discs, arms and heads can be readily used as desired.

The central body portion 112 of the actuator 110 is rotated about the actuator axis through application of current to an actuator coil (not visible in FIG. 1). The actuator coil is suspended in a magnetic field of a voice coil motor 122 (VCM). A flex circuit assembly 124 provides electrical communication paths between the actuator 110 and control electronics of the disc drive. The control electronics are supported on a disc drive printed circuit board (PCB) mounted to the underside of the base deck 102, and hence are not visible in FIG. 1.

The flex circuit assembly 124 includes a preamplifier driver circuit 126 (preamp) mounted to a side of the central body portion 112. Flex on suspension (FOS) conductors (not shown for clarity) are routed along the actuator arms 116 and the flexures 118 to connect the heads 120 with the preamp 126.

Figure 2:
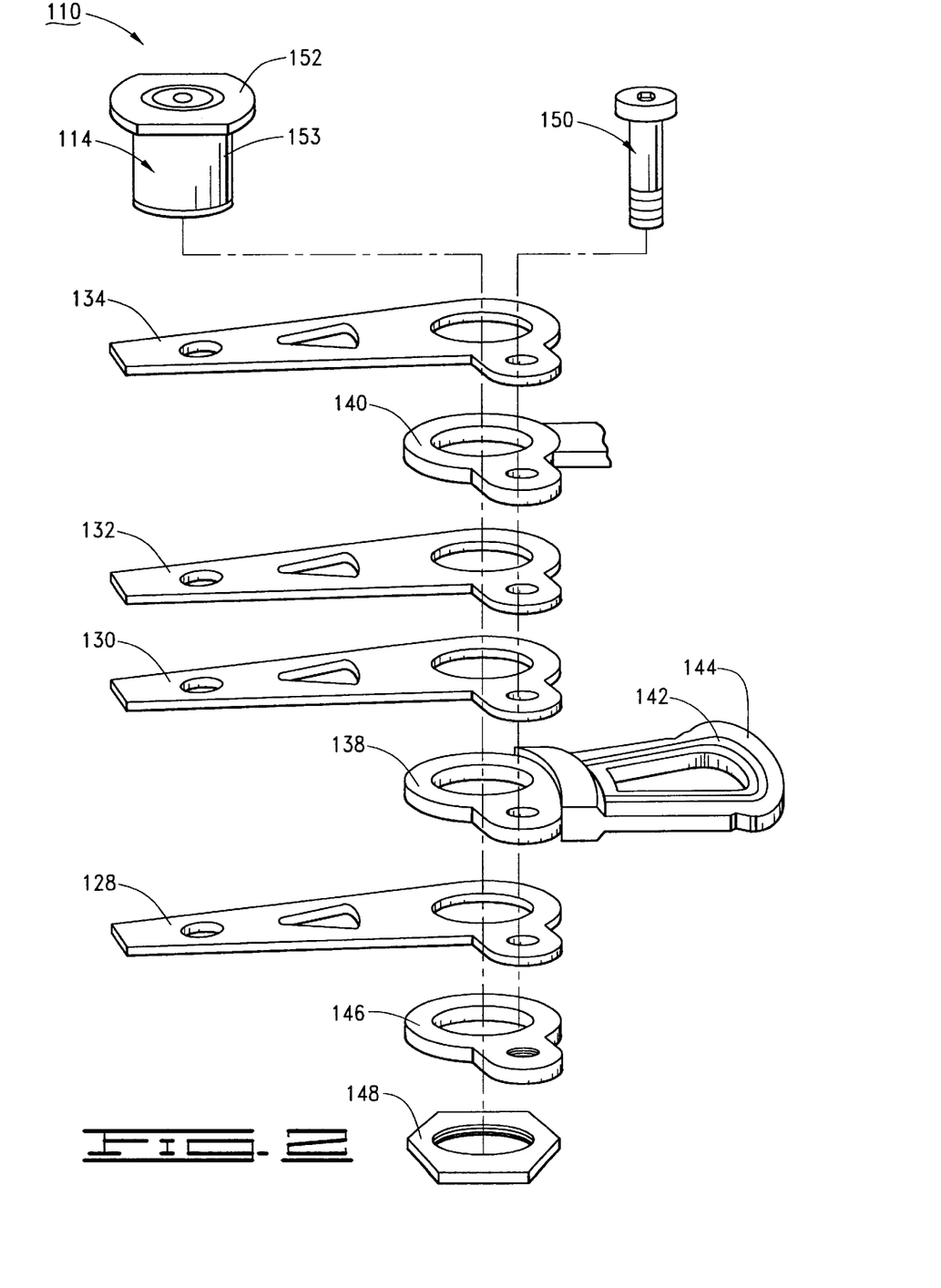
FIG. 2 is an exploded view of the stacked actuator of FIG. 1.

The actuator 110 is a stacked actuator formed by a number of substantially planar components which are brought together into an integrated stack during fabrication, as discussed in greater detail below. FIG. 2 provides an exploded view of various stackable members that form the actuator 110.

The three actuator arms 116 discussed in FIG. 1 are preferably formed by nominally identical arm members 128, 130, 132 and 134 shown in FIG. 2. The arm members 128, 130, 132 and 134 (also referred to as first, second, third and fourth arm members) are preferably stamped from a suitable material, such as stainless steel, magnesium and aluminum. Each arm member is preferably configured to support a single flexure (118, FIG. 1); hence, the middle actuator arm 116 in FIG. 1 (configured to extend between the two discs 108) is formed by the two adjacently disposed arm members 130 and 132. For clarity, flexure attachment features are not shown at the distal ends of the arm members 128, 130, 132 and 134, but it will be understood that any number of suitable attachment methodologies can be used to attach the flexures 118 including the use of swaging or adhesive.

FIG. 2 further shows first and second spacers 138 and 140 disposed between the arm members 128 and 130, and 132 and 134 respectively. The spacers 138 and 140 serve to establish the desired elevational locations of the arm members 128, 130, 132 and 134 along the actuator axis. Unlike the arm members 128, 130, 132 and 134, the spacers 138 and 140 are not nominally identical; rather, the first spacer 138 includes the aforementioned actuator coil (numerically designated at 142) which is supported in an overmold support 144.

A support plate 146 is disposed below the first arm member 128, and a threaded carriage nut 148 is disposed below the support plate 146. As explained below, during fabrication of the actuator 110 the support plate 146 engages threads of a counterbalance fastener 150 and the nut 148 engages threads on a distal end of the cartridge bearing assembly 114.

Figure 3:
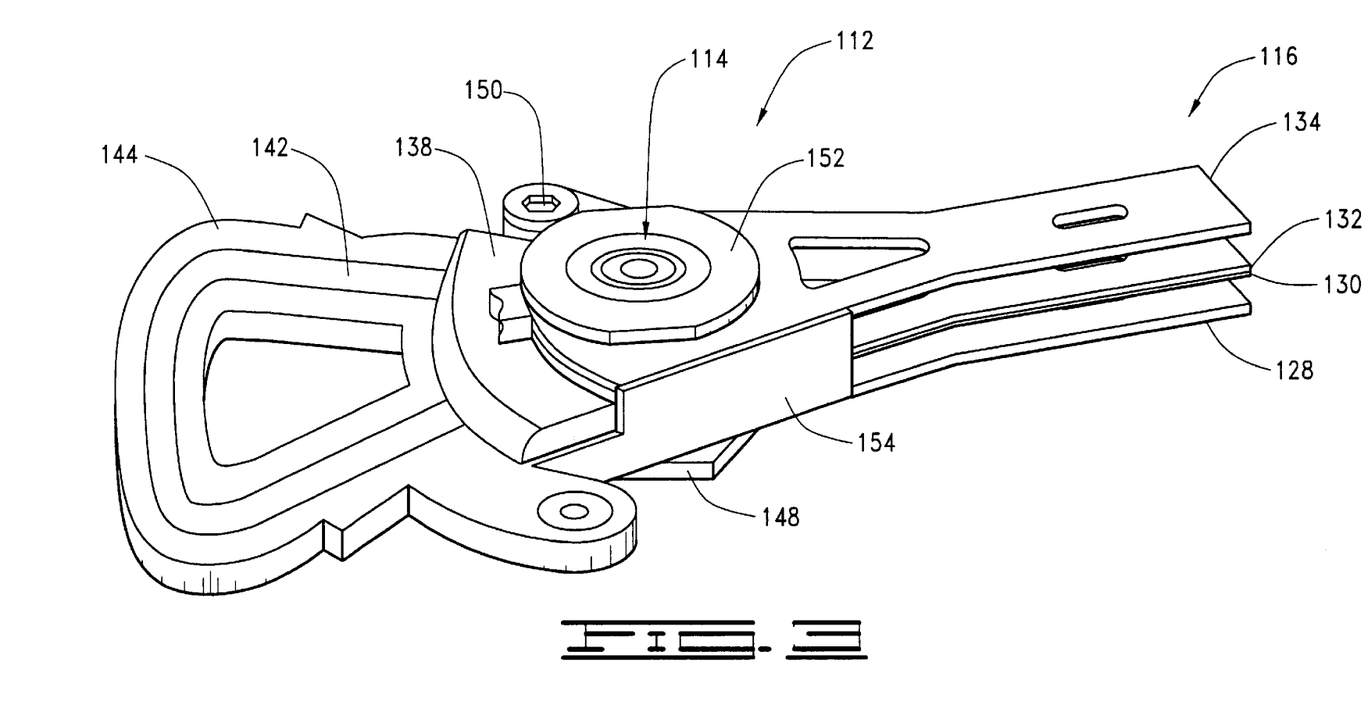
FIG. 3 is an isometric view of the stacked actuator of FIGS. 1 and 2 to generally illustrate features visible from inspection of a top side of the actuator.
Figure 4:
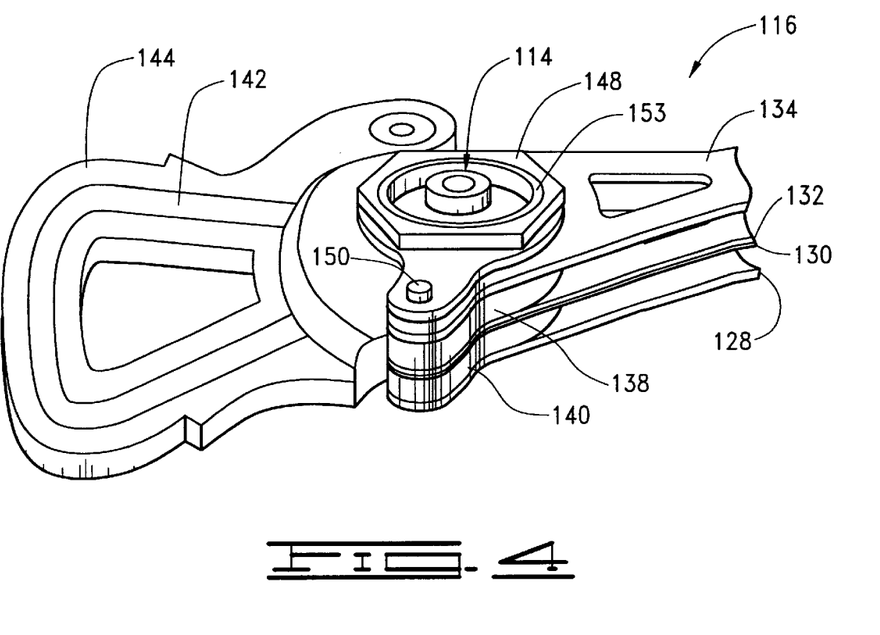
FIG. 4 is an isometric view of a portion of the stacked actuator of FIGS. 1–3 to generally illustrate features visible from inspection of a bottom side of the actuator.

FIGS. 3 and 4 provide respective top and bottom isometric views of relevant portions of the assembled actuator 110. FIG. 3 includes a view of a head flange 152 which projects from an outer bushing sleeve 153 of the cartridge bearing assembly 114. The head flange 152 bears against the fourth (topmost) arm member 134 upon installation of the cartridge bearing assembly 114. FIG. 3 further shows a flex circuit bracket 154 which supports relevant portions of the flex circuit assembly including the preamp 126 (shown in FIG. 1).

It will be noted at this point that any number of changes and modifications to the various components of the actuator 110 can be readily implemented as desired. For example, the coil 144 can be readily supported by an arm member instead of by a spacer member. The coil and associated support can comprise a separate element that is subsequently affixed to the central body portion 112. The cartridge bearing assembly 114 can be affixed within the central body portion 112 in a number of different ways besides through the use of the nut 148 and head flange 152.

Of particular interest to the present discussion is the configuration and operation of the counterbalance fastener 150, which advantageously provides at least two distinct functions within the stacked actuator 110. First, the fastener 150 is used during actuator fabrication to provide clamping of the various stackable members that form the component stack (such as the arm members 128, 130, 132 and 134 and the spacers 138 and 140). Such clamping is useful to maintain the stack in a desired integrated condition pending installation of the cartridge bearing assembly 114, the latter of which provides final clamping of the stack.

Second, during subsequent operation of the fully assembled actuator 110 the fastener 150 operates to remove imbalance in the actuator 110 induced by the mass of the flex circuit assembly 124, including the preamp 126. That is, the fastener is selected to be proximate a first selected side of the stack and the flex circuit assembly 124 is affixed proximate a second selected side of the stack opposite the first side. Selection of the proper location and mass of the fastener 150 allows the fastener 150 to act as a counterbalance to the mass of the flex circuit assembly so that the actuator is nominally balanced about the actuator rotational axis.

While the fastener 150 has been exemplified as a through-hole threaded bolt, such is not necessarily limiting to the scope of the claimed invention. Alternative configurations for the fastener include (and are not limited to) a press fit pin, an externally routed c-shaped clamp member, an adhesive member, a form in place member, a thermoplastic member and an elastic band type member.

Also, a separate fastener distinct from the stacked components is not necessarily required; for example, features could be provided within the spacers 138, 140 on one side of the actuator axis to serve as the counterbalance fastener. Such features would provide the desired interlocking of the stack during fabrication and the desired amount of counterbalancing during operation to offset the imbalance imparted by the flex circuit assembly 124. However, it is preferable to provide a solution that is easily manufacturable in an automated assembly environment and which promotes lower procurement costs for the individual components. The disclosed through-hole threaded bolt fastener 150 readily meets these requirements.

It will be noted that the location of the fastener 150 on the side of the actuator body portion 112 opposite the flex circuit assembly 124 provides further advantages as well. A lower mass actuator design is possible since there is no need to add additional mass opposite the flex circuit assembly 124 to counterbalance the mass of the flex circuit assembly 124. Also, locating the fastener 150 to the side of the body portion 112 allows the use of symmetric actuator arms that are balanced along a centerline 160 (FIG. 1) of the actuator 110, which improves resonance and tilt drop characteristics. Moreover, the coil 142 can be aligned with the centerline 160, further reducing undesired vibrational modes and potentially reducing manufacturing costs.

Based on the foregoing, the concept of the fastener 150 being opposite the flex circuit assembly 124 will now be understood to mean that the respective centers of mass of the fastener 150 and the flex circuit assembly 124 remain on opposing sides of the centerline 160. It is not necessarily required that a straight line drawn from the center of mass of the fastener 150 to the center of mass of the flex circuit assembly 124 pass directly through the actuator rotational axis in order for the fastener 150 to effectively counterbalance the flex circuit assembly 124.

Figure 5:
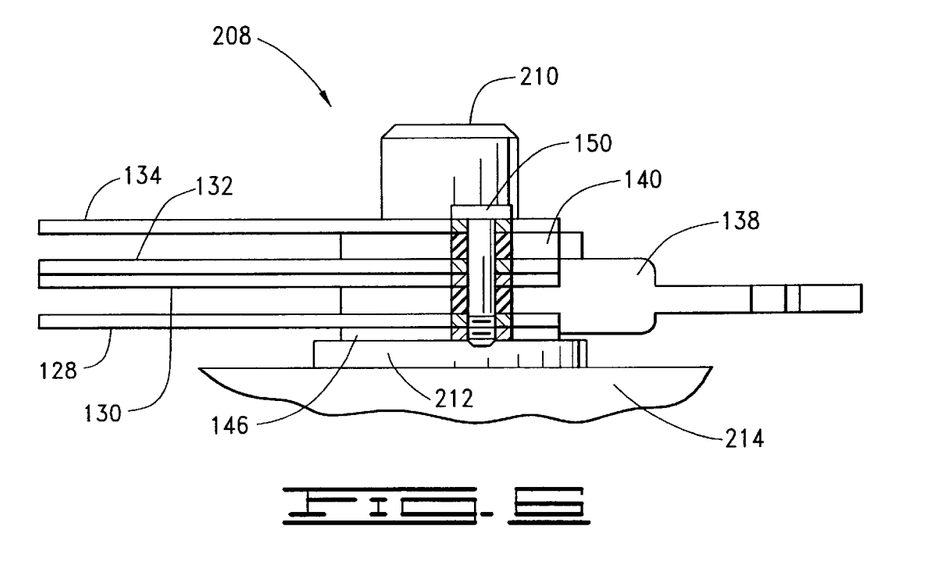
FIG. 5 provides a flow chart for a STACKED ACTUATOR FABRICATION routine generally illustrative of steps carried out in accordance with preferred embodiments to fabricate and install the stacked actuator of FIGS. 1–4.

FIG. 5 provides a STACKED ACTUATOR FABRICATION routine 200, illustrative of steps carried out in accordance with preferred embodiments of the present invention to fabricate a stacked actuator. The steps of FIG. 5 are preferably performed in a high volume automated assembly environment. To provide a concrete example, the routine 200 will be discussed in relation to the steps used to fabricate the stacked actuator 110 of FIGS. 1–4.

The required components to form the actuator are provided at step 202. The number of components will depend upon the final desired configuration and will preferably include at least one substantially planar arm member and at least one substantially planar spacer. For the actuator 110, step 202 involves providing the components shown in FIG. 2, including the four arm members 128, 130, 132, 134 and the two spacers 138, 140. At step 204, the components are placed upon a first assembly fixture to form a component stack, and at step 206 a counterbalance fastener (such as 150) is installed to secure the stackable components together into an integrated, unitary assembly.

FIG. 6 generally illustrates the operation of steps 204 and 206. The assembly fixture is generally designated at 208 and includes a post 210 having a diameter substantially that of the outer diameter of the cartridge bearing assembly 114. A support member 212 surrounds the post 210 and provides a support surface for the stack (for purposes of clarity, it will be noted that the distal end of the fastener 150 is shown to pass in front of the support member 212). The post 210 and support member 212 are in turn supported by a base 214.

From FIG. 6 and FIG. 2 it can readily be seen that step 204 of FIG. 5 involves sequential placement of the following components onto the post 210: the support plate 146; the first arm member 128; the first spacer 138; the second arm member 130; the third arm member 132; the second spacer 140; and the fourth arm member 134. Step 206 of FIG. 5 involves insertion of the fastener 150 through the respective apertures of the arm members and spacers, and the threading engagement of the distal end of the fastener 150 into the support plate 146. The fastener 150 is tightened to provide the desired amount of clamping force upon the stack. Care should be taken to apply sufficient torque to retain the fastener 150 during subsequent operation of the actuator 110 while not applying too much torque to impart tilting or distortion to the stack components.

Continuing with a review of the flow of FIG. 5, the stack is next removed from the assembly fixture at step 216 and inverted (i.e., rotated 180 degrees about the actuator centerline) at step 218. Using a second assembly fixture not illustrated in the drawings, the inverted stack is placed onto the cartridge bearing assembly 114 (which is also inverted) so that the cartridge bearing sleeve 153 passes through the central bores of the various stack components and the head flange 152 seats against the topmost arm member 134. The orientation of the stack during these steps is generally that shown in FIG. 4.

At step 222, the carriage nut 148 engages the threads of the cartridge bearing sleeve to affix the cartridge bearing assembly 114 within the central body portion 112 of the actuator 110. The head flange 152 and the nut 148 thus cooperate to provide primary clamping of the stackable members. Additional centering steps can also be applied during step 222 including the use of one or more centering screws (not shown) which project into the side of the actuator body portion 112 to bias the cartridge bearing assembly 114 against one side of the central aperture prior to the final tightening of the nut 148.

Remaining processing operations are then carried out as represented by general step 224 to complete the actuator 110. Such operations include attachment of the flexures 118 to the distal ends of the actuator arms 114 and attachment of the flex circuit assembly 124 to the actuator 110. The completed actuator 110 is then ready to be installed onto the base deck 102 and merged with the discs 108, as represented by step 226, after which the process ends at step 228.

It will now be understood that the present invention (as embodied herein and as claimed below) is generally directed to a disc drive stacked actuator and a method for fabricating the same. In accordance with preferred embodiments, a disc drive (such as 100) includes a disc (such as 108) rotatable about a disc axis and having a data recording surface.

A stacked actuator (such as 110) is provided adjacent the disc and comprises a plurality of stackable members preferably comprising at least one substantially planar arm member (such as 128, 130, 132 and 134) which supports a data transducing head (such as 120) adjacent the data recording surface and at least one substantially planar spacer (such as 138 and 140) which establishes an elevational location of the planar arm member, the stackable members forming a component stack configured for rotation about an actuator rotational axis. A flex circuit assembly (such as 124) is affixed to the component stack to provide a electrical communication path for the head.

A counterbalance fastener (such as 150) engages the component stack opposite the flex circuit assembly to secure the stackable members together and to remove imbalance about the actuator rotational axis induced by the flex circuit assembly. The fastener preferably comprises a through-hole threaded bolt which extends through a respective fastener aperture formed in each of the stackable members to secure the stackable members together.

Preferably, the stacked actuator further comprises a cartridge bearing assembly (such as 114) disposed within the component stack to facilitate rotation of the actuator about the actuator rotational axis, wherein the cartridge bearing assembly is disposed between the fastener and the flex circuit assembly. The flex circuit assembly preferably comprises a preamplifier driver circuit (such as 126) affixed to the component stack, wherein the fastener operates to remove imbalance induced by a mass of the preamplifier driver circuit.

The method preferably comprises steps including providing a plurality of stackable members (such as by step 202) comprising at least one substantially planar arm member configured to support a data transducing head and at least one substantially planar spacer configured to establish an axial location of the at least one arm member along an actuator rotational axis; arranging the stackable members into a component stack (such as by step 204); installing a counterbalance fastener at a fastener location proximate a first side of the component stack to secure the stackable members together (such as by step 206); and attaching a flex circuit assembly proximate a second side of the component stack opposite the first side to provide an electrical communication path for the actuator (such as by step 224), wherein the fastener location is selected such that a mass of the fastener operates to counterbalance a mass of the flex circuit assembly to nominally balance the actuator about the actuator rotational axis.

The method further preferably comprises installing a cartridge bearing assembly into a central bore of the component stack (such as by steps 220 and 222), the cartridge bearing assembly facilitating rotation of the actuator about the actuator rotational axis. The cartridge bearing assembly is preferably installed by providing the cartridge bearing assembly with a cylindrical outer bushing (such as 153) having a proximal end and a distal end, wherein a head flange (such as 152) radially extends about the proximal end and threads are provided on the distal end. The cartridge bearing assembly is inserted through the central bore of the component stack so that the head flange comes into abutting alignment with the component stack (such as by step 220), after which a carriage nut (such as 148) is installed onto the threads on the distal end of the outer bushing so that the carriage nut and the head flange cooperate to provide a clamping force upon the component stack. Preferably, the stackable members are arranged into the component stack such that a center of mass of an actuator coil is aligned along a centerline (such as 160) defined along a largest length of the at least one arm member.

For purposes of the appended claims, the function of the disclosed means for securing and for providing is carried out by the disclosed counterbalance fastener 150 configured and mounted as shown in the drawings as well as the alternative configurations discussed above.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application of the actuator assembly without departing from the spirit and scope of the present invention.

In addition, although the embodiments described herein are directed to a stacked actuator for a disc drive, it will be appreciated by those skilled in the art that the actuator can be used for other types of devices without departing from the spirit and scope of the claimed invention, including other types of recording devices such as optical disc memory storage devices as well as other types of systems in which a moveable actuator member is used.

What is claimed is:

1. A stacked actuator for use in a data storage device, comprising:
    a plurality of stackable members forming a component stack having opposing first and second sides and a centrally disposed actuator rotational axis; and
    a counterbalance fastener which engages the first side of the component stack to secure the stackable members together and to remove imbalance about the actuator rotational axis induced by a mass of an external component subsequently affixed to the second side of the component stack.

2. The actuator of claim 1, wherein the external component comprises a flex circuit assembly affixed to the second side of the component stack.

3. The actuator of claim 2, wherein the flex circuit assembly comprises a preamplifier driver circuit affixed to the second side of the component stack.

4. The actuator of claim 1, wherein the plurality of stackable members comprises a substantially planar arm member configured to support a data transducing head.

5. The actuator of claim 4, wherein the plurality of stackable members further comprises a spacer which establishes a desired elevational location of the arm member along the actuator rotational axis.

6. The actuator of claim 1, further comprising a bearing cartridge assembly disposed within a central bore of the component stack to facilitate rotary movement of the stacked actuator about the actuator rotational axis, and wherein the fastener and the component are affixed on opposing sides of the cartridge bearing assembly.

7. The actuator of claim 1, wherein the fastener comprises a through-hole threaded fastener which extends through a respective fastener aperture formed in each of the stackable members to secure the stackable members together.

8. A data storage device, comprising:
    a disc rotatable about a disc axis and having a data recording surface; and
    a stacked actuator adjacent the disc, comprising:
        a plurality of stackable members comprising at least one substantially planar arm member which supports a data transducing head adjacent the data recording surface and at least one substantially planar spacer which establishes an elevational location of the planar arm member, the stackable members forming a component stack configured for rotation about an actuator rotational axis;
        a flex circuit assembly affixed to the component stack to provide a electrical communication path for the head; and
        means for securing the stackable members together and for removing imbalance in the actuator induced by the flex circuit assembly.

9. The data storage device of claim 8, wherein the means for securing and for removing comprises a counterbalance fastener affixed to the component stack opposite the flex circuit assembly.

10. The data storage device of claim 9, further comprising a cartridge bearing assembly disposed within the component stack to facilitate rotation of the actuator about the actuator rotational axis, wherein the cartridge bearing assembly is disposed between the fastener and the flex circuit assembly.

11. The data storage device of claim 9, wherein the flex circuit assembly comprises a preamplifier driver circuit affixed to the component stack, and wherein the fastener operates to remove imbalance induced by a mass of the preamplifier driver circuit.

12. The data storage device of claim 9, wherein the fastener comprises a through-hole threaded bolt which extends through a respective fastener aperture formed in each of the stackable members to secure the stackable members together.

13. A method for fabricating a stacked actuator for use in a data storage device, comprising:
    providing a plurality of stackable members comprising at least one substantially planar arm member configured to support a data transducing head and at least one substantially planar spacer configured to establish an axial location of the at least one arm member along an actuator rotational axis;
    arranging the stackable members into a component stack;
    installing a counterbalance fastener at a fastener location proximate a first side of the component stack to secure the stackable members together; and
    attaching a flex circuit assembly proximate a second side of the component stack opposite the first side to provide an electrical communication path for the actuator, wherein the fastener location is selected such that a mass of the fastener operates to counterbalance a mass of the component stack operably combined with the flex circuit assembly to nominally balance the actuator about the actuator rotational axis.

14. The method of claim 13, further comprising:
    determining an amount of imbalance that would be induced by attachment of the flex circuit assembly without installation of the fastener; and
    selecting the mass of the fastener and the fastener location in relation to the determined amount of imbalance.

15. The method of claim 13, further comprising installing a cartridge bearing assembly into a central bore of the component stack, the cartridge bearing assembly facilitating rotation of the actuator about the actuator rotational axis.

16. The method of claim 15, wherein the step of installing a cartridge bearing assembly comprises:
    providing the cartridge bearing assembly with a cylindrical outer bushing having a proximal end and a distal end, wherein a head flange radially extends about the proximal end and threads are provided on the distal end;
    inserting the cartridge bearing assembly through the central bore of the component stack so that the head flange comes into abutting alignment with the component stack; and
    installing a carriage nut onto the threads on the distal end of the outer bushing so that the carriage nut and the head flange cooperate to provide a clamping force upon the component stack.

17. The method of claim 13, wherein the step of providing a plurality of stackable members comprises providing a plurality of nominally identical arm members each configured to support a data transducing head.

18. The method of claim 17, wherein a selected stackable member from the step of providing a plurality of stackable members comprises an actuator coil of a voice coil motor.

19. The method of claim 18, wherein the step of arranging the stackable members into a component stack comprises aligning a center of mass of the coil along a center line of the at least one arm member defined along a largest length of the at least one arm member.

* * * * *